United States Patent [19]

Abe

[11] 4,183,640
[45] Jan. 15, 1980

[54] AUTOMATIC FOCUS ADJUSTING DEVICE

[75] Inventor: Masao Abe, Tokyo, Japan

[73] Assignee: Nihon Beru-Haueru Kabushiki Kaisha, Higashimurayama, Japan

[21] Appl. No.: 871,727

[22] Filed: Jan. 23, 1978

[30] Foreign Application Priority Data

Jan. 28, 1977 [JP] Japan .................. 52-007861

[51] Int. Cl.² .............................................. G03B 13/18
[52] U.S. Cl. .................................... 354/25; 250/204; 352/140
[58] Field of Search ................ 354/25, 163, 167, 168, 354/169; 352/139, 140; 250/201, 204; 356/5

[56] References Cited
U.S. PATENT DOCUMENTS 3,958,117  5/1976  Stauffer .............................. 250/201

FOREIGN PATENT DOCUMENTS 2508376  8/1975  Fed. Rep. of Germany ............ 354/25

*Primary Examiner*—L. T. Hix
*Assistant Examiner*—William B. Perkey
*Attorney, Agent, or Firm*—Aaron Passman; Kirk M. McInerney; Roger M. Fitz-Gerald

[57] ABSTRACT

A rangefinder mechanism is shown in which the scanning mirror has been replaced with a movable scanning optic. The automatic rangefinder system includes a pair of optical paths, one a reference path and the other a scanned path, which are lead to impinge upon a photosensitive surface for comparison purposes. The output of the photosensitive surface is used to adjust the main lens of the camera. The range of the movable optic is coordinated with the position of the main lens of the camera as feedback and adjustment of the rangefinder.

10 Claims, 4 Drawing Figures

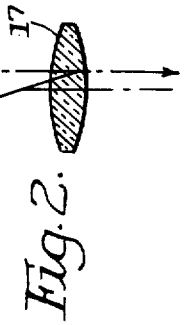
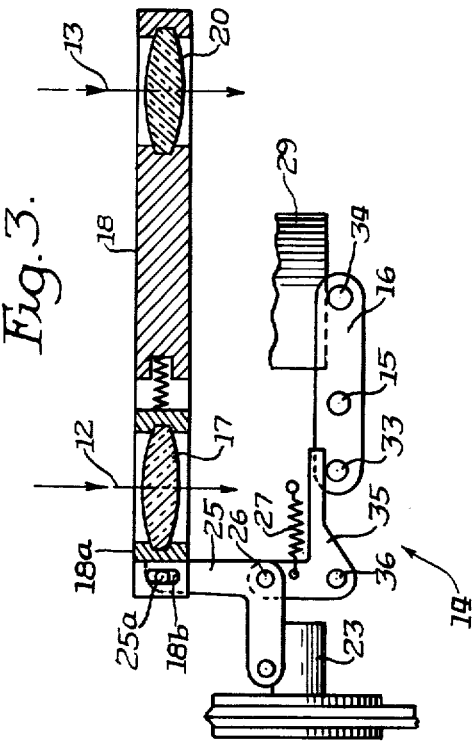
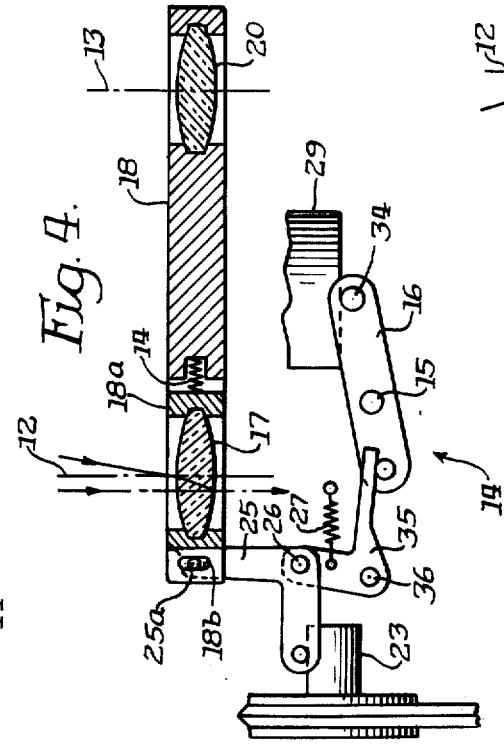
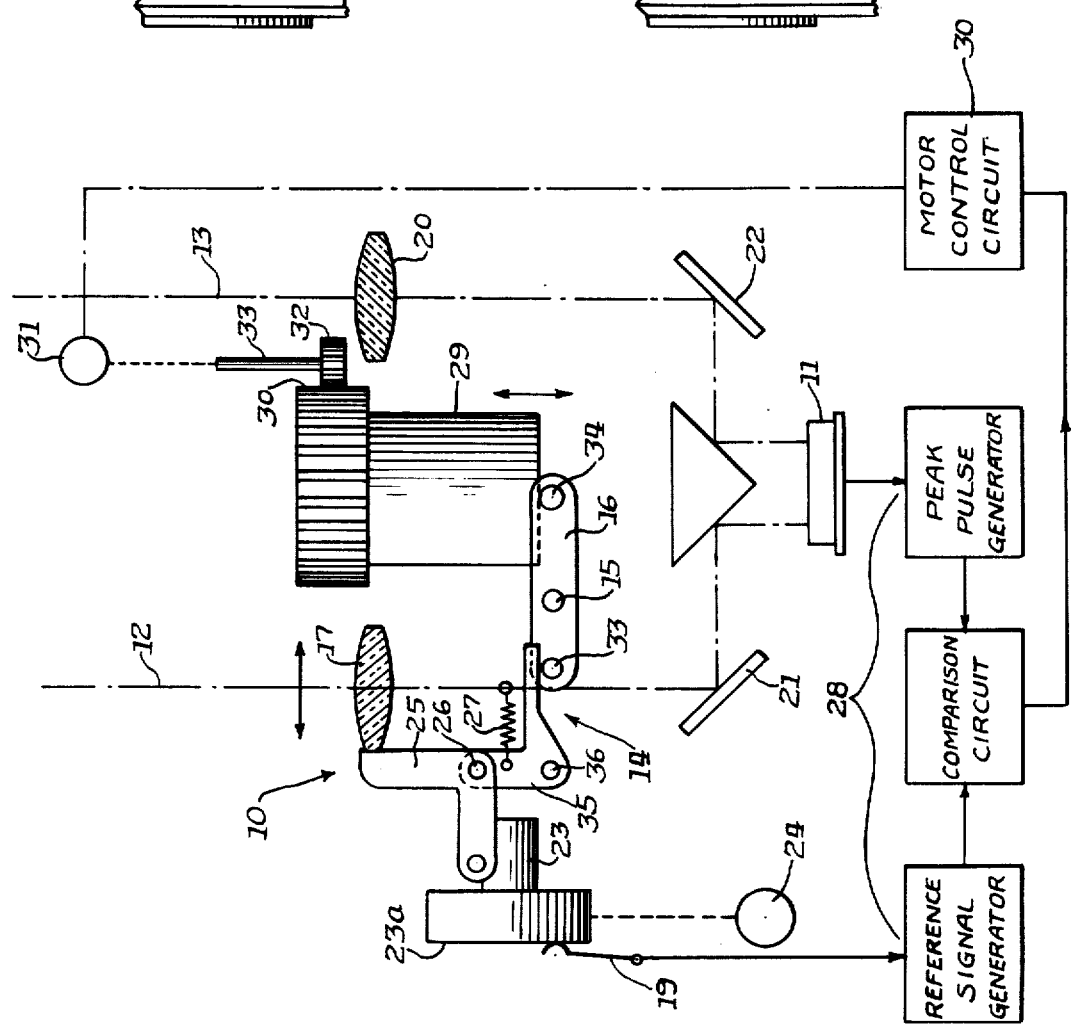

4,183,640

AUTOMATIC FOCUS ADJUSTING DEVICE

BACKGROUND OF THE INVENTION

This invention relates to automatic rangefinders of the type generally described in U.S. Pat. No. 4,002,899 assigned to Honeywell, Inc. Such automatic rangefinders and focusing systems include two optical paths that bring light from the subject to photosensitive detectors. Such detectors are photosensitive devices and as such respond to the fact that both optical systems are aligned with one another and are directed toward the same subject. This alignment is called coincidence and generates a pulse from the photosensitive detector which can be used to adjust the focus of the main camera lens. One of the paths is fixed relative to the rangefinder and the other is movable so as to scan the image. The rangefinding is accomplished by triangulation and comparison of the image from the fixed path with an image from the scanned path. Scanning in these types of rangefinders is normally accomplished by use of a movable mirror (oscillating) to cover the field of view (angular) of the image. The use of such mirrors is cumbersome and does not permit an easy connection for feedback from the main lens. In addition, moving mirror surfaces cause a problem in that the angle of the scan has to be doubled in order to effectively cover the field of view.

It is an object of the present invention to replace the scanning mirror with a movable optic which is responsive to the position of the lens and the angular field of view of the subject.

It is a further object of the invention to simplify the structure required to oscillate or scan the subject and thereby improve the reliability and lower the cost of the mechanism for such scanning apparatus.

SUMMARY OF THE INVENTION

There is shown a system for an automatic rangefinder which includes a pair of light paths from the subject to a photosensitive detector. Within the paths is included a pair of fixed mirrors to direct the light paths from the subject to a photosensitive detector and along one of the paths a movable optic is included. The optic consists of a bi-convex lens mounted for movement relative to the position of the main camera lens and for dithered scanning movement relative to the light path. The aforesaid optic forms a dynamic lens system which provides the requisite scanning and feedback necessary to permit electronic circuitry to compare the output of the photosensitive detector with a reference signal and adjust the main lens accordingly.

BRIEF DESCRIPTION OF THE DRAWINGS

FIG. 1 is a detailed schematic presentation of an automatic rangefinding system with the movable mechanical lens supporting elements shown relative to the electronic control circuitry necessary for the operation of the system.

FIG. 2 is a schematic presentation of how the movement of the bi-convex lens influences the scanned light path.

FIGS. 3 and 4 are schematic presentations of the mechanism for movement of bi-convex scanning lens that causes the light path to scan the subject shown respectively in different ranges of travel as adjusted by movement of the shooting lens.

DETAILED DESCRIPTION OF THE DRAWINGS

An automatic rangefinder 10 controlled by electronic sensing circuitry is shown in FIG. 1 and it includes a simple scanning system 14 responsively coupled to the focusing lens 29 for feedback input. In FIG. 1, there is a photosensitive detector 11 which generates a pulse when the objective images received from the subject coincide. The images are brought along two rangefinder light paths 12 and 13 to the photosensitive detector 11. The scanning system 14 is in light path 12 and includes a movable optic between the subject and the photosensitive detector 11. Along light path 12 is a lens 17 of bi-convex shape; it is carried on a sliding frame 18a which is movable in an horizontal plane across and normal to path 12. As will be described in detail, frame 18a supports the movable optic for feedback and scanning respectively.

The scanning system 14 consists of lens 17 which is moved across light path 12. In order to introduce a similar medium in light path 13, there is a fixed bi-convex lens 20 interposed in light path 13. Lenses 17 and 20 are supported on frame 18. Thus, the light coming from the subject to the photosensitive detector 11 must pass through the same amount of optical resistance, be it lenses or distance. Similarly, there are mirrors 21 and 22 positioned along both optical paths 12 and 13 which deflect the image from the subject toward the photosensitive detector 11. Mirror 22 is positioned between lens 20 and photosensitive detector 11 and mirror 21 is positioned between scanning system 19 and photosensitive detector 11.

Scanning system 14 is responsive to the main focusing lens 29 by means of linkage including a contact arm 16. Contact arm 16 carries a pin 34 which rides on an edge of focusing lens 29 such that as lens 29 moves axially fore or aft pin 34 is pushed accordingly. Contact arm 16 is pivotally mounted at axis 15, and the other end thereof has a pin 33 which moves arcuately with respect to the axial motion of focusing lens 29. Pin 33 contacts a crank 35 which is pivotally supported at axis 36 for arcuate movement thereabout. The other end of crank 35 supports a pivot pin 26 which carries a lens moving cam crank 25 for oscillatory pivotal movement thereon. A spring 27 urges crank 35 against pin 33 so that crank 35 follows the movements of lens 29 through the input of arm 16.

Bi-convex lens 17 is carried on frame 18 in a sub-frame 18a which is responsive to an eccentric cam 23. A spring 14 between frame 18 and sub-frame 18a shown in FIGS. 3 and 4 biases cam crank 25 against cam 23. Cam 23 is rotated by motor 24 and has a cam face 23a designed to transmit reciprocating motion to a switch 19 to close same at least once per revolution. Cam crank 25 is pivotally carried at axis 26 which is movably adjustable in response to the lens 29 movement such that as cam 23 rotates crank 25 reciprocates moving frame 18 transversely to path 12 causing bi-convex lens 17 to also reciprocate relative to path 12. A lost motion connection is provided between crank 25 and frame 18a in the form of a pin 25a and slot 18b connection in their respective members whereby arcuate movement of crank 25 is transferred as reciprocating movement to frame 18a.

As shown in FIGS. 2 and 4, movement of lens 17 causes path 12 to angularly scan the field of the subject. In FIG. 2 the refraction of the optical path 12 is shown in detail wherein a shifting of lens 17 causes the light to be refracted in accordance with the curvature of the lens 17 whereby the field of view of optical path 12 is bent as shown from a line parallel to the axis of lens 17. Dithered movement as proscribed by sub-frame 18a clearly causes the path 12 to oscillate along a defined section of path 13 in a manner set forth by the rate at which the lens 17 is moved transverse and normal to the path 12. In FIG. 2 the reciprocal shifting of lens 17 relative to path 12 causes a deflection of path 12 relative to the subject. The transverse movement of lens 17 permits a simple mechanism to scan the incoming path 12 and adjustment in accordance with the position of the focusing lens 29 is accomplished by shifting the pivot 26 for crank 25 in relation to the axial position of lens 29.

As mentioned, the cam 23 also has a switch cam 23a which is used to provide a periodic reference signal for the comparison electronic circuitry 28. More particularly, there is a switch contact arm 19 which rides on face cam 23a. Switch 19 periodically signals the comparison electronic circuitry 28. Also connected to circuitry 28 is photosensitive detector 11. In a manner well known photosensitive detector 11 puts out a peak signal relative to a given time interval, as established by the periodic signal of switch 19 and cam 23a, when the image from the subject brought on path 13 and the image from the subject brought on path 12 coincide. The signal generated by cam 23a is timed to occur once in every revolution of the cam 23; for example, when the optical axis of the movable scanning system 14 is aligned at either the near or far focus position the timed signal is transmitted by switch 19. when lens 17 is oscillated to a point where path 12 is transmitting the same image to photosensitive detector 11 as is being transmitted on path 13, a pulse is sent from detector 11 to the comparison circuitry 28. If lens 29 is out of focus adjustment the periodic signal and peak pulse are spaced apart in time in accordance with the difference (angular) between the path 12 at the instance when lens 17 is shifted to bend path 12 towards the subject. That angular difference is calculated by the electronic comparison circuitry 28 and fed into the electronic motor control circuitry 30.

In operation a power supply (not shown) supplies energy to the various circuits and motors. When the control circuit 30 receives the signal of the difference from electronic comparison circuitry 28 power is accordingly relayed to a lens control motor 31. Motor 31 includes a motor shaft 33 connected to a motor pinion gear 32. Enmeshed with pinion 32 is a lens gear 29a circumferentially mounted about focusing lens 29. As the control circuit 30 relays energy to the motor 31 which turns lens 29 for focus adjustment, the lens 29 moves (in a manner well known) axially along its optical axis and transmits that motion to pins 33 and 34 on arm 16 thereby rotating crank 35 to shift crank 25 moving the position of the range of travel of lens 17. The shift applied to lens 17 will decrease the difference between the reference signal from cam 23a and the coincidence pulse from the detector 11. This decrease in difference is a proximate result of the mechanical feedback input from the linkage between focusing lens 29 and lens 17. As this difference becomes zero, the control response relayed from control circuitry 30 also becomes zero.

As those skilled in the art will appreciate many changes and refinements can be made to the construction and it is therefore contemplated that the claims which follow will cover all of the various combinations, permutations and arrangements.

What is claimed is:

1. In a camera with a focusable main lens and automatic rangefinder therefor, wherein the rangefinder includes a photosensitive detector having a surface responsive to light from a subject received along two separate optical paths, and also includes a pulse generator adapted to transmit a peak pulse when the light received from the two paths is in coincidence on the surface of the photosensitive detector, comprising:

a main focusing lens for a camera mounted for fore and aft movement relative to the camera along a main optical axis for focus adjustment, a first optical system defining a reference path between a subject and the surface of the photosensitive detector having a first optical axis fixed relative to the rangefinder and aimed substantially the same as said main optical axis, a second optical system defining a path along which light may be transmitted from the subject to the surface of the photosensitive detector including a second optical axis movable relative to said first optical axis, a rangefinder objective lens in said second optical system mounted for regular periodic transverse movement in said second optical system to move said second optical axis and to develop a scanning movement of the light over the surface of the photosensitive detector, means coupling said main lens and said rangefinder objective lens for shifting the objective lens along its optical axis in response to adjustments in the focus position of the main focusing lens thereby to change the scanning range of the lens and of the light on the surface of the photosensitive detector, a reference signal generator for generating a periodic signal indicative of a predetermined position of the rangefinder objective lens in its regular periodic transverse movement, a comparison circuit for receiving pulses from the peak pulse generator and from said reference signal generator and which provides an output signal corresponding to the time differential between the pulses from the two generators, and drive means for receiving said output signal from said comparison circuit and for driving the main focusing lens in accordance with said output signal thereby to adjust the focus position and to change the scanning range of said rangefinder objective lens, whereby the time differential between the pulses from the peak pulse generator and from the reference signal generator is affected and said output signal is changed to terminate the drive and to establish proper focus.

2. The camera and automatic rangefinder of claim 1 wherein said rangefinder objective and its coupling means are driven by a cam to cause transverse oscillations normal to said first optical system path.

3. The camera and automatic rangefinder of claim 2 wherein said rangefinder objective is a bi-convex lens with its optical axis aligned substantially parallel to said first optical system path.

4. The camera and automatic rangefinder of claim 2 wherein said first and second paths impose substantially the same optical and distance influence upon the light transmitted from the subject to the photosensitive surface such that the intensity of light from said paths is equal when directed toward the same subject.

5. The camera and automatic rangefinder of claim 1 wherein said rangefinder objective is mounted for reciprocal movement relative to said second optical system path and is driven by cam and crank for periodic reciprocal movement.

6. The camera and automatic rangefinder of claim 5 wherein said crank is mounted for pivotal movement relative to said camera and is coupled to said main focusing lens so that fore and aft movement of said focusing lens causes a shift in the pivot therefor thus varying the range of relative arcuate movement of said crank along said first optical system path.

7. The camera and automatic rangefinder of claim 6 wherein said rangefinder objective is a bi-convex lens.

8. The camera and automatic rangefinder of claim 5 wherein said cam includes a discontinuity along another surface thereof for activating a switching means to transmit a periodic signal to said electronic comparison means and thereby defining each revolution thereof.

9. The camera and automatic rangefinder of claim 8 wherein said comparison circuit calculates the timed difference between when the peak pulse and the periodic signal are received and provides an output signal in accordance therewith to said control means for operation thereof.

10. The camera and automatic rangefinder of claim 9 wherein said drive means responds to said output signal by supplying power to a motor connected to drive said focus lens in or out along its optical axis.

* * * * *